(12) United States Patent
Jhao

(10) Patent No.: US 7,507,007 B1
(45) Date of Patent: Mar. 24, 2009

(54) POWER-GENERATING ILLUMINATION DEVICE FOR A BICYCLE

(76) Inventor: Yin Jhong Jhao, No. 36-1, Lane 66, Fanhua Rd., Sioushuei Township, Changhua County 50443 (TW)

( * ) Notice: Subject to any disclaimer, the term of this patent is extended or adjusted under 35 U.S.C. 154(b) by 0 days.

(21) Appl. No.: 12/068,137

(22) Filed: Feb. 4, 2008

(51) Int. Cl.
*B62J 6/00* (2006.01)
*H02K 33/00* (2006.01)

(52) U.S. Cl. .................. 362/475; 362/476; 362/42; 362/192; 362/193; 318/128; 318/127; 318/126

(58) Field of Classification Search ............. 362/42, 362/37, 473–476, 192, 193; 318/126–128, 318/118, 227; 315/76–78, 185 S, 200 A
See application file for complete search history.

(56) References Cited

U.S. PATENT DOCUMENTS

2006/0072330 A1* 4/2006 Koharcheck et al. ........ 362/473

2006/0232988 A1* 10/2006 Wang et al. .................. 362/475

* cited by examiner

*Primary Examiner*—Tuyet Vo
(74) *Attorney, Agent, or Firm*—Banger Shia

(57) ABSTRACT

A power-generating illumination device for the bicycle comprises comprising at least one permanent magnet disposed onto wheel spokes so as to form a rotor, an induction coil assembly mounted onto a fork for forming a stator, such that during the rotation of the rotor, the induction coil assembly may be cut by magnetic lines of force to generate electrical energy for being outputted to a light-emitting unit, characterized in between the induction coil assembly and the light-emitting unit is provided with a control unit at least including a wave detector, a wave filter, and a current limiting resistor so that the wave detector, the wave filter, and the current limiting resistor are connected together to form a loop, thereby detecting and filtering polarity of voltage of the generated electrical energy and lowering the resonating frequency to maintain the service life and illuminative brightness.

8 Claims, 5 Drawing Sheets

POWER-GENERATING ILLUMINATION DEVICE FOR A BICYCLE

BACKGROUND OF THE INVENTION

1. Field of the Invention

The present invention relates to a power-generating illumination device for a bicycle that may stabilize and filter the waveform of the electrical energy to maintain the service life and illuminative brightness thereof.

2. Description of the Prior Arts

A rotor for a bicycle or an exercise bicycle is activated to rotate by pedaling the pedal, a plurality of permanent magnets are disposed onto wheel spokes so as to form a rotor, and an induction coil assembly is mounted onto a fork so as to form a stator, such that during the rotation of the rotor, the induction coil assembly may be cut by magnetic lines of force to generate electrical energy, and then the electrical energy may be outputted to a light-emitting unit, obtaining an illuminating purpose.

Such a conventional light-emitting technology has been disclosed in TW Publication Nos. M320997, M320521 and M317381 and the like prior arts, however the electrical energy generated from the induction coil assembly may cause a discontinuous problem and large waveform oscillation, having an unstable illumination. Besides, the discontinuous electrical energy may decrease the service life of the light-emitting device.

The present invention has arisen to mitigate and/or obviate the afore-described disadvantages.

SUMMARY OF THE INVENTION

The primary object of the present invention is to provide a power-generating illumination device for a bicycle that may stabilize and filter the waveform of the electrical energy to maintain the service life and illuminative brightness thereof.

In accordance with one aspect of the present invention, there is provided a power-generating illumination device for a bicycle comprising at least one permanent magnet disposed onto rotatable wheel spokes so as to form a rotor;

an induction coil assembly including two distribution lines extended therefrom and mounted onto a fork so as to form a stator, such that during the rotation of the rotor, the induction coil assembly may be cut by magnetic lines of force so that the distribution lines generate electrical energy;

a control unit at least including a wave detector for connecting with one distribution line, a wave filter connected between the wave detector and another distribution line, a current limiting resistor coupled to the wave detector so as to parallelly connect with the wave filter, such that the wave detector, the wave filter and the current limiting resistor will form a loop; the wave detector may detect polarity of voltage of the generated electrical energy, and the wave filter may filter the generated electrical energy and lowering its resonating frequency;

a LED unit coupled between the current limiting resistor and the wave filter for receiving the outputted electrical energy through the control unit.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
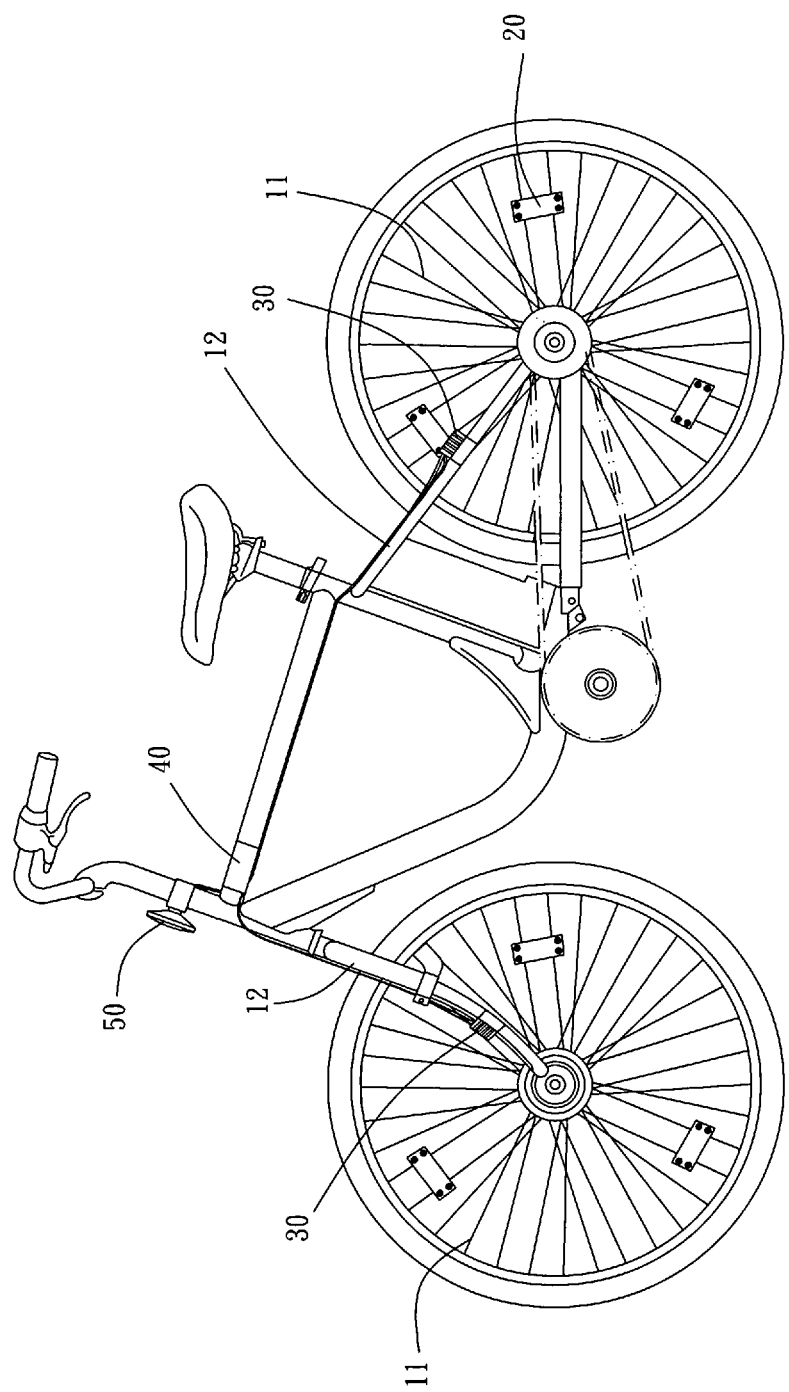
FIG. 1 is a front plan view illustrating the application of a power-generating illumination device for a bicycle according to the present invention.
Figure 2:
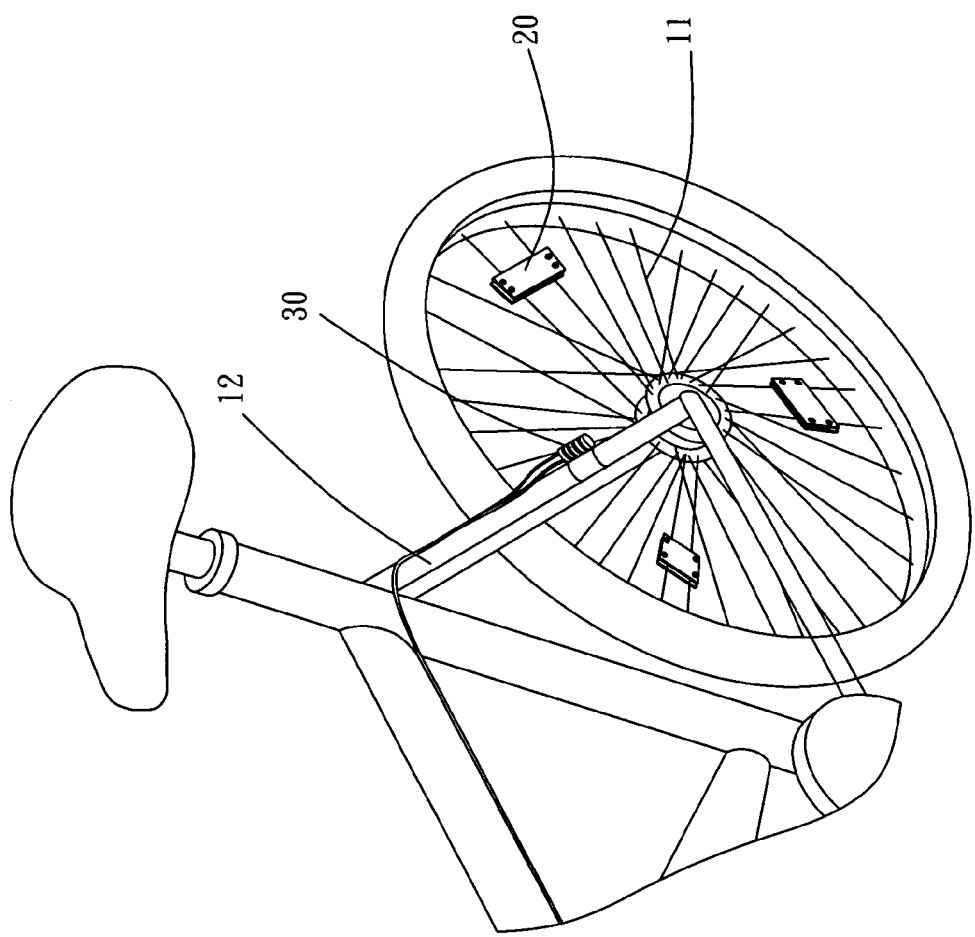
FIG. 2 is a partial perspective view illustrating the application of the power-generating illumination device for the bicycle according to the present invention.
Figure 3:
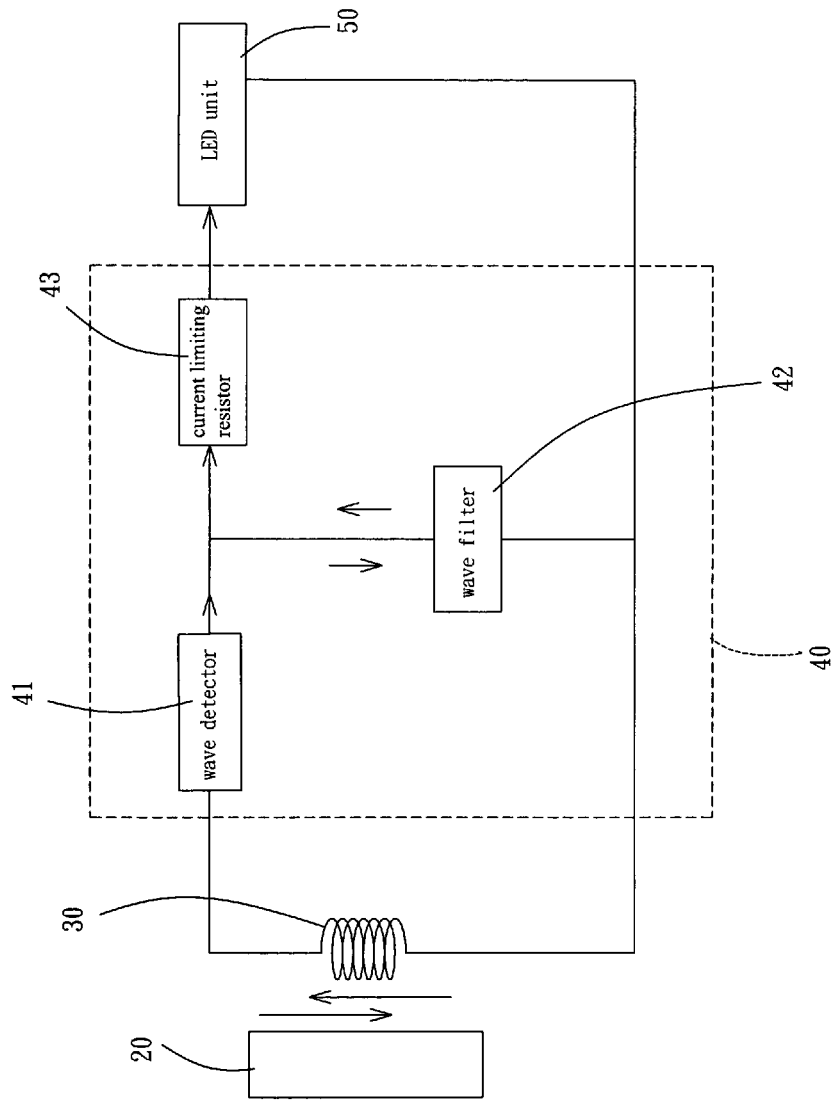
FIG. 3 is a schematic view illustrating the circuit of the power-generating illumination device for the bicycle according to the present invention.

As shown in FIGS. 1-4, a power-generating illumination device for a bicycle in accordance with the present invention comprises at least one permanent magnet 20 disposed onto rotatable wheel spokes 11 so as to form a rotor;

an induction coil assembly 30 including two distribution lines extended therefrom and mounted onto a fork 12 so as to form a stator, such that during the rotation of the rotor, the induction coil assembly 30 may be cut by magnetic lines of force so that the distribution lines generate electrical energy;

a control unit 40 at least including a wave detector 41 for connecting with one distribution line, a wave filter 42 connected between the wave detector 41 and another distribution line, a current limiting resistor 43 coupled to the wave detector 41 so as to parallelly connect with the wave filter 42, such that the wave detector 41, the wave filter 42 and the current limiting resistor 43 will form a loop; the wave detector 41 may detect polarity of voltage of the generated electrical energy, and the wave filter 42 may filter the generated electrical energy and lowering its resonating frequency;

a LED unit 50 coupled between the current limiting resistor 43 and the wave filter 42 for receiving the outputted electrical energy through the control unit 40, thereby obtaining an illuminating purpose.

Figure 4:
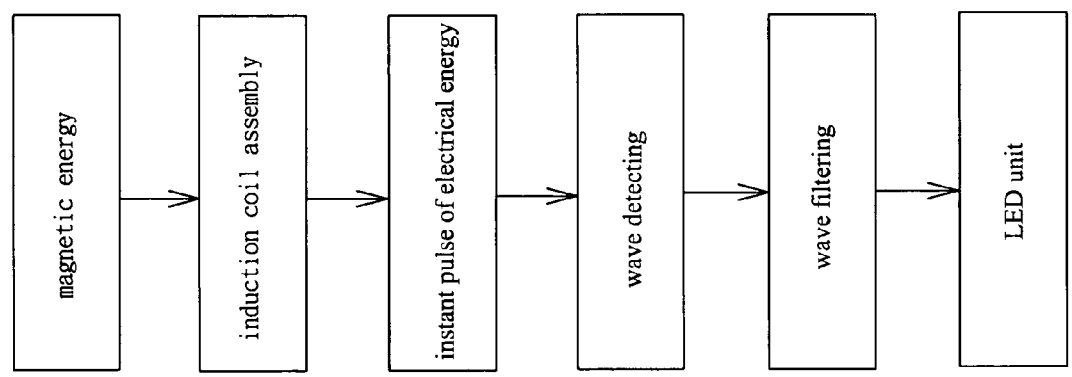
FIG. 4 is a flow chart illustrating the operation of the power-generating illumination device for the bicycle according to the present invention.

Further referring to FIG. 4, during the rotation of the rotor, the power-generating illumination device of the present invention may act the induction coil assembly 30 to be cut by the magnetic lines of force for generating electrical energy, thus making a signal. Thereafter, the signal is detected, filtered and then inputted to the LED unit 50 through the current limiting resistor 43, thus stabilizing and filtering the waveform of the electrical energy. On the other hand, the discontinuous and oscillatory problem of the electrical energy may be effectively prevented, maintaining the brightness of the enabled LED unit 50 within a specific range. It is to be noted that the current limiting resistor 43 may be adjustable to control and maintain the brightness of the LED unit 50. Furthermore, in the enabling process of the stabilized electrical energy, the service life of the LED unit 50 and its related components may be maintained, thereby improving the stability of the power-generating illumination device.

Figure 5:
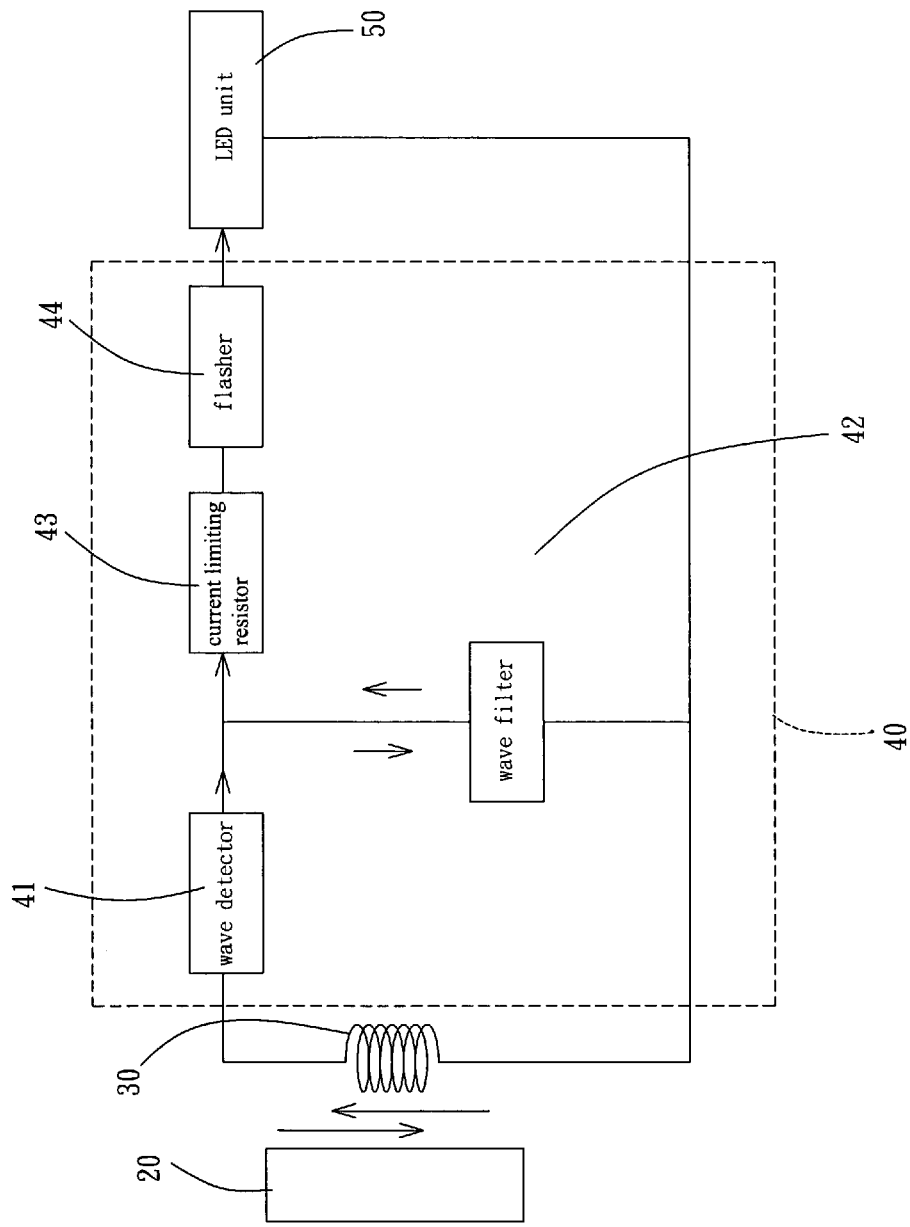
FIG. 5 is a schematic view illustrating the circuit of the power-generating illumination device for the bicycle according to another embodiment of the present invention.

As illustrated in FIG. 5, in another embodiment of the present invention, the control unit 40 may include a flasher 44 affixed between the current limiting resistor 43 and the LED unit 50, thereby achieving a flash warning effect.

The invention is not limited to the above embodiment but various modifications thereof may be made. It will be understood by those skilled in the art that various changes in form and detail may made without departing from the scope and spirit of the present invention.

What is claimed is:

1. A power-generating illumination device for a bicycle comprising at least one permanent magnet disposed onto wheel spokes so as to form a rotor, an induction coil assembly mounted onto a fork for forming a stator, such that during the rotation of the rotor, said induction coil assembly may be cut by magnetic lines of force to generate electrical energy for being outputted to a light-emitting unit, characterized in between said induction coil assembly and said light-emitting unit is provided with a control unit at least including a wave detector, a wave filter, and a current limiting resistor so that said wave detector, said wave filter, and said current limiting resistor are connected together to form a loop.

2. The power-generating illumination device for the bicycle as claimed in claim 1, wherein said induction coil assembly includes two distribution lines extended therefrom;

said wave detector is coupled with one distribution line;
said wave filter is connected between said wave detector and another distribution line;
said current limiting resistor is coupled to said wave detector so as to parallelly connect said wave filter;
said light-emitting unit is coupled between said current limiting resistor and said wave filter.

3. The power-generating illumination device for the bicycle as claimed in claim 1, wherein said control unit includes a flasher affixed between said current limiting resistor and said light-emitting unit.

4. The power-generating illumination device for the bicycle as claimed in claim 1, wherein said light-emitting unit is LED.

5. The power-generating and illuminating control device of the bicycle as claimed in claim 1, wherein said current limiting resistor may be adjustable to control and maintain the brightness of said light-emitting unit.

6. The power-generating illumination device for the bicycle as claimed in claim 5, wherein said induction coil assembly includes two distribution lines extended therefrom;

said wave detector is coupled with one distribution line;
said wave filter is connected between said wave detector and another distribution line;
said current limiting resistor is coupled to said wave detector so as to parallelly connect said wave filter;
said light-emitting unit is coupled between said current limiting resistor and said wave filter.

7. The power-generating illumination device for the bicycle as claimed in claim 5, wherein said control unit includes a flasher affixed between said current limiting resistor and said light-emitting unit.

8. The power-generating illumination device for the bicycle as claimed in claim 5, wherein said light-emitting unit is LED.

* * * * *